US010659696B2

(12) United States Patent
Yoshimi

(10) Patent No.: US 10,659,696 B2
(45) Date of Patent: May 19, 2020

(54) ELECTRONIC DEVICE, CONTROL METHOD OF ELECTRONIC DEVICE, AND STORAGE MEDIUM

(71) Applicant: CANON KABUSHIKI KAISHA, Tokyo (JP)

(72) Inventor: Takashi Yoshimi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/124,835

(22) Filed: Sep. 7, 2018

(65) Prior Publication Data

US 2019/0089887 A1 Mar. 21, 2019

(30) Foreign Application Priority Data

Sep. 15, 2017 (JP) .................................. 2017-178220

(51) Int. Cl.
| | | |
|---|---|---|
| H04N 5/232 | (2006.01) | |
| H04N 5/77 | (2006.01) | |
| H04N 1/00 | (2006.01) | |
| G06F 3/0489 | (2013.01) | |

(52) U.S. Cl.
CPC ... *H04N 5/232933* (2018.08); *G06F 3/04897* (2013.01); *H04N 1/00458* (2013.01); *H04N 5/232* (2013.01); *H04N 5/23245* (2013.01); *H04N 5/772* (2013.01); *H04N 2201/0084* (2013.01)

(58) Field of Classification Search
CPC ............. H04N 1/00445; H04N 1/0044; H04N 1/00442; H04N 1/00458; H04N 2201/0084; H04N 5/232; H04N 5/23293; H04N 5/232933; H04N 5/772
See application file for complete search history.

(56) References Cited

U.S. PATENT DOCUMENTS

| 6,819,356 B1 * | 11/2004 | Yumoto ............... H04N 1/0473 348/231.2 |
| 8,482,650 B2 | 7/2013 | Shimma |
| 2008/0068469 A1 * | 3/2008 | Takagi ................. G11B 27/322 348/231.2 |

(Continued)

FOREIGN PATENT DOCUMENTS

| JP | 2007-221769 A | 8/2007 |
| JP | 2010-288269 A | 12/2010 |

*Primary Examiner* — Daniel M Pasiewicz
(74) *Attorney, Agent, or Firm* — Venable LLP

(57) ABSTRACT

A display control device of the invention accepts a predetermined operation of switching an image to an image moved by a predetermined number of images among multiple images arranged in predetermined order. When a single-image that is not one of group images is displayed on a display unit of the display control device and single-images are arranged from the currently displayed image to an image moved by a predetermined number of images, the image moved by the predetermined number of images is acquired in accordance with a predetermined operation. When one of group images is displayed on the display unit and the group images are arranged within the predetermined number of images, a process of acquiring an image arranged beyond the group images without displaying images included in the group images is performed in accordance with a predetermined operation. Next, the acquired image is displayed on the display unit.

10 Claims, 9 Drawing Sheets

(56) References Cited

U.S. PATENT DOCUMENTS

2009/0059022 A1     3/2009   Tanaka
2010/0283859 A1   11/2010   Shimma
2013/0076705 A1*   3/2013   Murata .................. G06F 16/54
                                                                          345/204

* cited by examiner

ELECTRONIC DEVICE, CONTROL METHOD OF ELECTRONIC DEVICE, AND STORAGE MEDIUM

BACKGROUND OF THE INVENTION

Field of the Invention

The present invention relates to an electronic device and a method thereof that can perform control of switching images to be displayed.

Description of the Related Art

As a display scheme of group images including a plurality of images taken by burst capture or the like, there is a scheme of displaying any one of the group images as a representative image. Japanese Patent Application Laid-Open No. 2007-221769 discloses that, when fast forwarding of images is instructed by an operation such as continuous pressing of an image forwarding key, a representative image out of a series of images (group images) including a plurality of images captured by burst capture or used for image synthesis is displayed.

Further, there is a scheme that, in response to an instruction of image forwarding, images are forwarded for the number of images based on the user setting. Japanese Patent Application Laid-Open No. 2010-288269 discloses that date-based jump, 10-image jump, or 100-image jump can be set as an image jump menu. In Japanese Patent Application Laid-Open No. 2010-288269, images with respective dates are displayed one by one in accordance with pressing a button in the case of date-based jump, and images to be displayed are skipped by the designated number of images and switched in accordance with pressing of a button in the case of jump based on the number of images.

A user may forward images in order to find a desired image from a plurality of images. In Japanese Patent Application Laid-Open No. 2007-221769, the user has to switch images to be displayed one by one until a desired image is displayed in a case of images not included in a series of images such as a case of burst capture or image synthesis. In the jump based on the number of images of Japanese Patent Application Laid-Open No. 2010-288269, when group images such as burst capture images are included, the group images may not be displayed when the number of a series of images is less than the number of jumped images. Further, when the number of group images is greater than the number of jumped images, many images of the group images may be sequentially displayed.

SUMMARY OF THE INVENTION

The present invention switches images to display any one of a plurality of images arranged in predetermined order on a display unit.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

In the present embodiment, an imaging device (a digital camera 100) will be illustrated as an example of application of the electronic device according to the present invention. The digital camera of the present embodiment is adapted to be able to capture and store a static image or a moving image and has a function of providing attribute information described later to each captured image.

Configuration of Digital Camera

Figure 1:
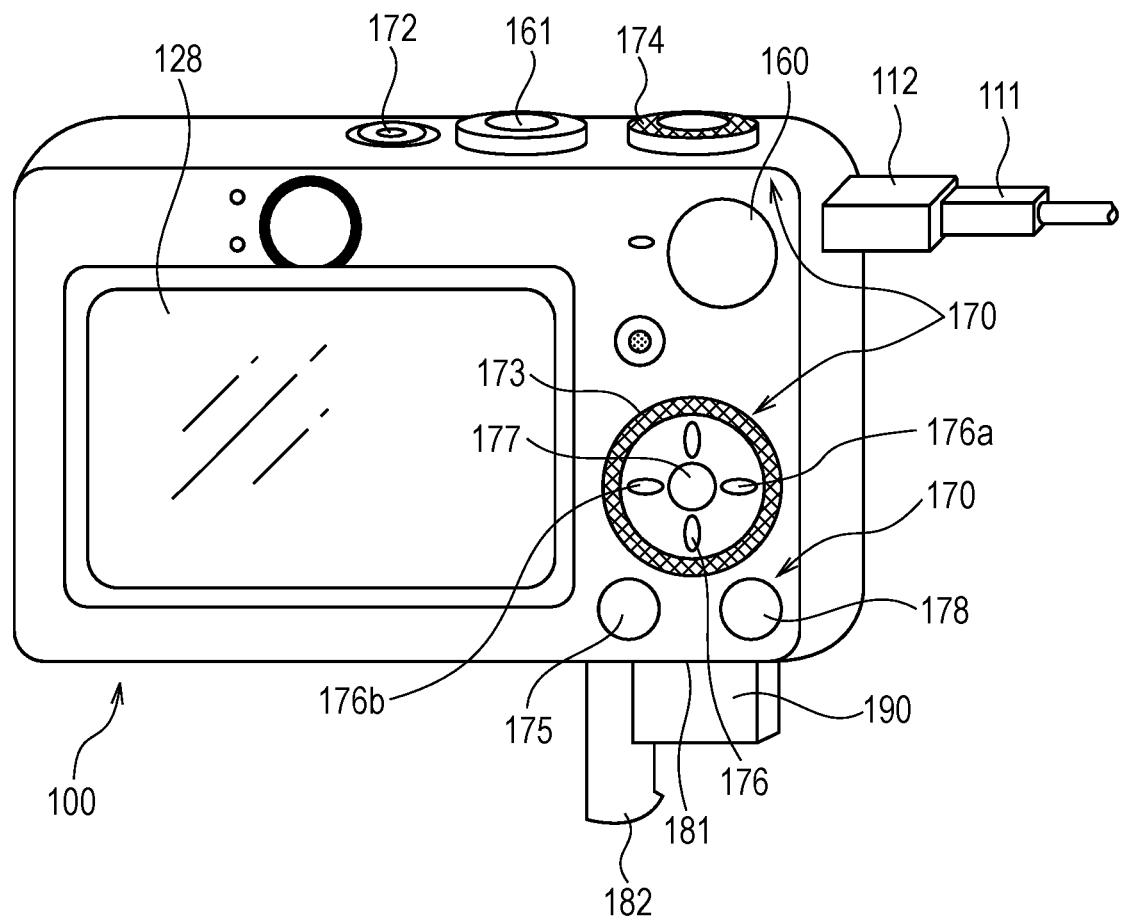
FIG. 1 is an external appearance of a digital camera as an example according to the present embodiment.

FIG. 1 is a diagram illustrating a general external arrangement of the digital camera 100.

A display unit 128 is a monitor that displays an image or various information. A shutter button 161 is an operating unit by which a user instructs capturing. A mode selection switch 160 is a switch operating unit by which the user instructs switching of various modes. A power switch 172 is a switch that switches power-on and power-off in response to the user operation.

Operating units 170 includes various operating components such as various buttons, dials, or the like that can receive a setting operation or other various operations by the user. The operating units 170 includes a controller wheel 173, an electronic sub-dial 174, a menu key 178, a play button 175, and a moving image button, and the like. Each of the controller wheel 173 and the electronic sub-dial 174 is a rotatable circular operating member. A four-direction button 176 and a set button 177 are arranged in an area inside the rotatable member of the controller wheel 173. The four-direction button 176 includes an up key and down key (also referred to as up-down key(s)) and a left key 176*b* and a right key 176*a* (also referred to as left-right key(s)).

A connector 112 is an interface unit to which a connection cable 111 used for data communication or the like is connected. A storage medium 190 is a storage medium such as a memory card, a hard disk, or the like. The storage medium slot 181 is a slot that removably stores the storage medium 190 and provided with a lid 182 that can be opened and closed. The storage medium 190 stored in the storage medium slot 181 is able to communicate with the digital camera 100.

Internal Configuration of Digital Camera

Figure 2:
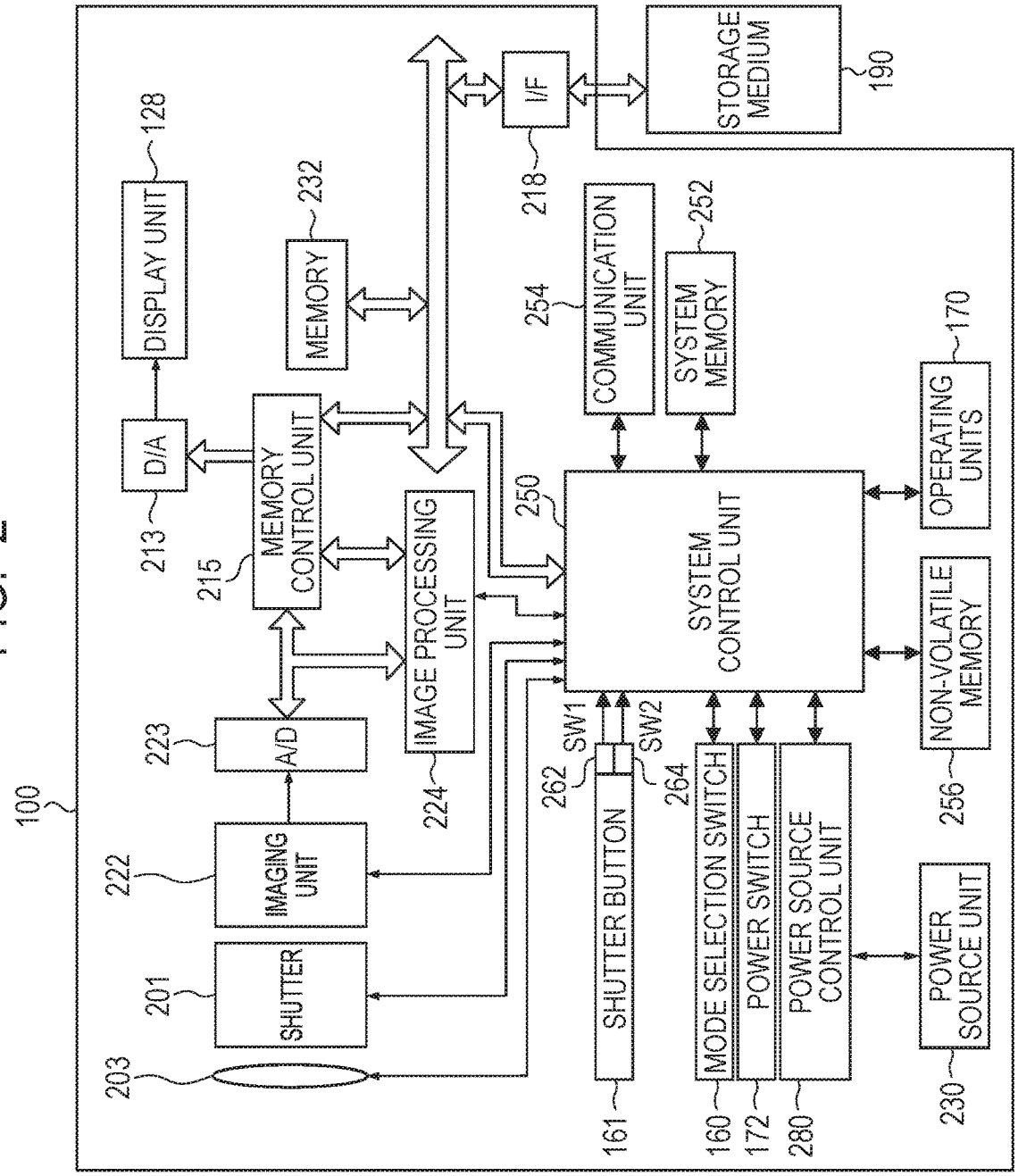
FIG. 2 is a block diagram illustrating a general configuration of the digital camera of the present embodiment.

FIG. 2 is a block diagram illustrating a general internal configuration of the digital camera 100 of the present embodiment (the digital camera 100 of FIG. 1). In FIG. 2, a capture lens 203 is a group of lenses including a zoom lens and a focus lens and captures a subject image or the like on an imaging plane of an imaging unit 222. A shutter 201 is a shutter having an aperture function. The imaging unit 222 is an imaging device formed of a CCD, a CMOS, or the like that converts an optical image captured on the imaging plane by the capture lens 203 into an electrical signal. An analog-to-digital (A/D) converter 223 converts an analog imaging signal output from the imaging unit 222 into a digital image data.

An image processing unit 224 performs various signal processing such as resize processing such as pixel interpolation, image scaling, or the like, color conversion processing, gamma correction, contour correction, or the like on image data from the A/D converter 223 or image data read out from memory 232 by a memory control unit 215 described later. Further, the image processing unit 224 performs a predetermined calculation process by using captured image data and transmits information on the calculation result to a system control unit 250. The system control unit 250 performs exposure control, ranging control, or the like based on information on the calculation result transmitted from the image processing unit 224. This enables an autofocus (AF) process, an auto-exposure (AF) process, a flash pre-light emission (EF) process, or the like of a so-called a through the lens (TTL) scheme to be performed. The image processing unit 224 further performs a predetermined calculation process by using captured image data and performs an auto-white balance (AWB) process of the TTL scheme based on the obtained calculation result.

Image data output from the A/D converter 223 is directly written to the memory 232 by the image processing unit 224 and the memory control unit 215 or otherwise by the memory control unit 215. The memory 232 stores image data that is captured by the imaging unit 222 and digitally converted by the A/D converter 223 or image data used for display on the display unit 128. The memory 232 has a sufficient storage capacity for storing a large number of static images or a long time moving image data and audio data. The memory 232 also serves as the memory used for displaying images (video memory).

A digital-to-analog (D/A) converter 213 converts digital image data to be displayed read out from the memory 232 into an analog image signal and supplies the analog image signal to the display unit 128. Thereby, the image to be displayed read out from the memory 232 is displayed on a screen of the display unit 128. The display unit 128 displays an image based on an analog image signal from the D/A converter 213 on a display screen such as a liquid crystal display (LCD). Further, when image data digitally converted by the A/D converter 223 and temporarily accumulated in the memory 232 is converted into analog data and sequentially transferred to the display unit 128, the display unit 128 will function as a so-called electronic view finder. That is, a live view image (through image) is displayed on the display unit 128 in this case.

A non-volatile memory 256 is an electrically erasable and storable memory, and an EEPROM may be used, for example. In the non-volatile memory 256, constants, programs, and the like used for the operation of the system control unit 250 are stored. A program as used herein includes a program by which the system control unit 250 or the like performs each flowchart described later in the present embodiment.

The system control unit 250 controls the entire digital camera 100. Each process described later in the present embodiment is implemented by the system control unit 250 executing a program according to the present embodiment stored in the non-volatile memory 256. A system memory 252 is a RAM or the like. In the system memory 252, constants and variables used for the operation in the system control unit 250, a program read out from the non-volatile memory 256, or the like are expanded. Further, the system control unit 250 performs display control by controlling the memory 232, the D/A converter 213, the display unit 128, or the like.

The mode selection switch 160, the shutter button 161, the operating units 170 are used when the user inputs various operation instructions to the system control unit 250. The mode selection switch 160 is used when the user switches the operation mode of the digital camera 100 into any one of a static image capture mode, a moving image capture mode, a playback mode, and the like. The static image capture mode further includes an auto-capture mode, an auto-scene determination mode, a manual mode, various scene modes for capture settings for respective capture scenes, a program AE mode, a custom mode, or the like. A mode to be used of these modes is not only set by the user from the displayed menu items on the display unit 128 through the operation of a menu key 178 of FIG. 1, for example, but also is able to be directly switched and set through the operation of the mode selection switch 160. Alternatively, after a use of mode selection switch 160 is switched to a use of the menu key 178, and another operating component or the like may be used to switch the mode to be used. Similarly, the moving image capture mode may include a plurality of modes.

A first shutter switch 262 is turned on (ON) when it is in a state where the shutter button 161 provided in the digital camera 100 is in the middle of a press operation, that is, in a so-called half-push (capture preparation instruction) state and generates a first shutter switch signal SW1. In response to the first shutter signal SW1 being supplied, the system control unit 250 starts operation such as an autofocus (AF) process, an auto-exposure (AE) process, an auto-white balance (AWB) process, a flash pre-light emission (EF) process, or the like.

A second shutter switch 264 is turned on (ON) when it is in a state where the shutter button 161 is in a state where a press operation is completed, that is, in a so-called full push (capture instruction) state and generates a second shutter switch signal SW2. In response to the second shutter switch signal SW2 being applied, the system control unit 250 starts a series of capture process operation from a signal readout operation performed by the imaging unit 222 to a wiring operation of image data to the storage medium 190.

Respective buttons or the like of the operating units 170 are properly allocated with functions for respective scenes when various function icons displayed on the display unit 128 are selected by the user and are able to be used as various function buttons. As a function button may be, for example, an end button, a return button, an image forwarding button, a jump button, a refine search button, an attribute change button, or the like. Once the menu key 178 is pressed, a menu window in which various settings are possible is displayed on the display unit 128, and the user can use the menu window displayed on the display unit 128 and the four-direction/setting buttons to intuitively perform various setting such as setting of these function buttons or the like.

The power source control unit 280 is formed of a battery detection circuit, a DC-DC converter, a switch circuit that switches blocks to be powered, or the like and detects the presence or absence of insertion of a battery, the type of the battery, or the remaining battery level. Further, the power source control unit 280 controls the DC-DC converter based on the detection result and an instruction from the system control unit 250 and supplies a necessary voltage to each unit including the storage medium 190 for a necessary period.

The power source unit 230 includes a primary battery such as an alkali battery, a lithium battery, or the like or a secondary battery such as an NiCd battery, an NiNH battery, an Li battery, or the like, a connection part to an AC adapter, and the like. A storage medium interface (I/F) 218 is an interface with the storage medium 190 such as a memory card, a hard disk, or the like. The storage medium 190 is a storage medium such as a memory card or the like used for storing captured images and formed of a semiconductor memory, a magnetic disk, or the like.

A communication unit 254 connects to an external device wirelessly or via a wired cable and transmits and receives an image signal or an audio signal. The communication unit 254 can also connects to a wireless local area network (LAN) or the Internet. The communication unit 254 can transmit an image captured by the imaging unit 222 (including a through image) or an image stored in the storage medium 190 and can also receive image data or other various information from an external device.

Operation of Image Playback Mode

Figure 3:
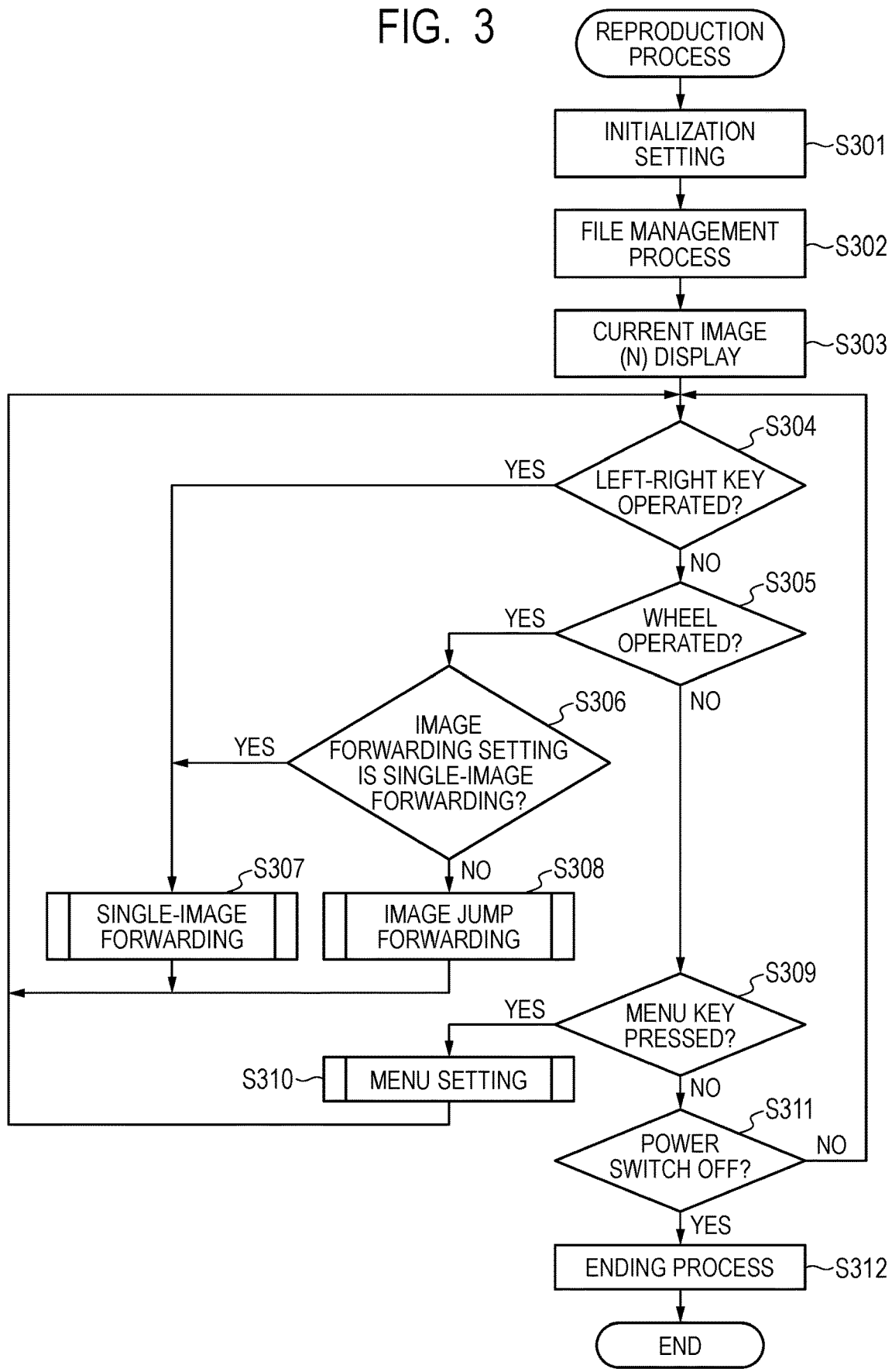
FIG. 3 is a flowchart illustrating an operation of an image playback mode.

FIG. 3 is a flowchart illustrating a playback process of displaying an image on the screen of the display unit 128 performed by the digital camera 100 of the present embodiment. The system control unit 250 expands a program stored in the non-volatile memory 256 or the like to the system memory 252 and executes it, and thereby each process in this flowchart is implemented. In the following description, steps S301 to step S312 of the flowchart in FIG. 3 are simply denoted as S301 to S312, respectively. The same applies to other flowcharts described later.

Once the power switch 172 is operated and power is turned on, in S301, the system control unit 250 initializes flags, control variables, or the like. Subsequently, in S302, the system control unit 250 starts a management process for files stored in the storage medium 190 and, in S303, further displays a current image on the display unit 128.

Next, in S304, the system control unit 250 determines whether or not the left-right key (the right key 176a or the left key 176b) in the four-direction button 176 of the operating units 170 is operated. If it is determined that the left-right key is operated in S304, the system control unit 250 transfers the process to S307 and performs control for single-image forwarding in S307. If it is determined that neither the right key 176a nor the left key 176b is operated in S304, the system control unit 250 proceeds to S305. Note that the process of the single-image forwarding in S307 will be described later in detail by using a flowchart of FIG. 4.

In S305, the system control unit 250 determines whether or not the controller wheel 173 of the operating units 170 is operated and transfers the process to S306 if it is determined that the controller wheel 173 is operated while transfers the process to S309 if it is determined that the controller wheel 173 is not operated.

In S306, the system control unit 250 refers to the setting of image forwarding caused by rotation of the controller wheel 173 stored in the system memory 252, and if the setting of image forwarding is a single-image forwarding setting, transfers the process to S307 and performs control for single-image forwarding. As discussed above, the single-image forwarding may be performed by a button operation of pressing of the left-right key or may be performed by rotation of the controller wheel 173 in the single-image forwarding setting.

In S306, if it is determined that the setting of image forwarding is not a single-image forwarding setting, that is, when the setting is an image jump forwarding setting, the system control unit 250 transfers the process to S308 and performs control for image jump forwarding. The system control unit 250 then transfers the process back to S304 after the image jump forwarding is performed in S308. Note that the process of the image jump forwarding in S308 will be described later in detail by using a flowchart of FIG. 8. In this way, the image jump forwarding is performed by rotation of the controller wheel 173 in the image jump forwarding setting. The image jump forwarding may be performed by holding down the touchscreen, rotary-operating a dial, or pressing a particular button.

In S309, the system control unit 250 determines whether or not the menu key 178 is operated. If it is determined that the menu key 178 is operated, the system control unit 250 then transfers the process to S310 and performs control for a menu setting. Note that the menu setting process in S310 will be described later in detail by using a flowchart of FIG. 9. On the other hand, if it is determined that the menu key 178 is not operated in S309, the system control unit 250 transfers the process to S311.

In S311, the system control unit 250 determines whether or not the power switch 172 is turned off (OFF). If it is determined that a turn-off operation is made, the system control unit 250 transfers the process to S312 and performs an ending process such as a process of changing the display on the display unit 128 to an end state, a process of storing the setting on a capture mode or the display selected by the user to the non-volatile memory 256, or the like. Upon the completion of the ending process, the system control unit 250 ends the process of the flowchart of FIG. 3 and turns off the power source. On the other hand, in S311, if it is determined that the power switch 172 is not turned off, the system control unit 250 transfers the process back to S304.

As described above, when the left-right key of the four-direction button 176 is operated in a playback process, a single-image forwarding is performed in accordance with the operation on the left-right key. Further, when the image forwarding setting is the image jump forwarding setting, the image jump forwarding is performed in accordance with a rotation operation of the controller wheel 173.

Description of Single-Image Forwarding Operation

Figure 4:
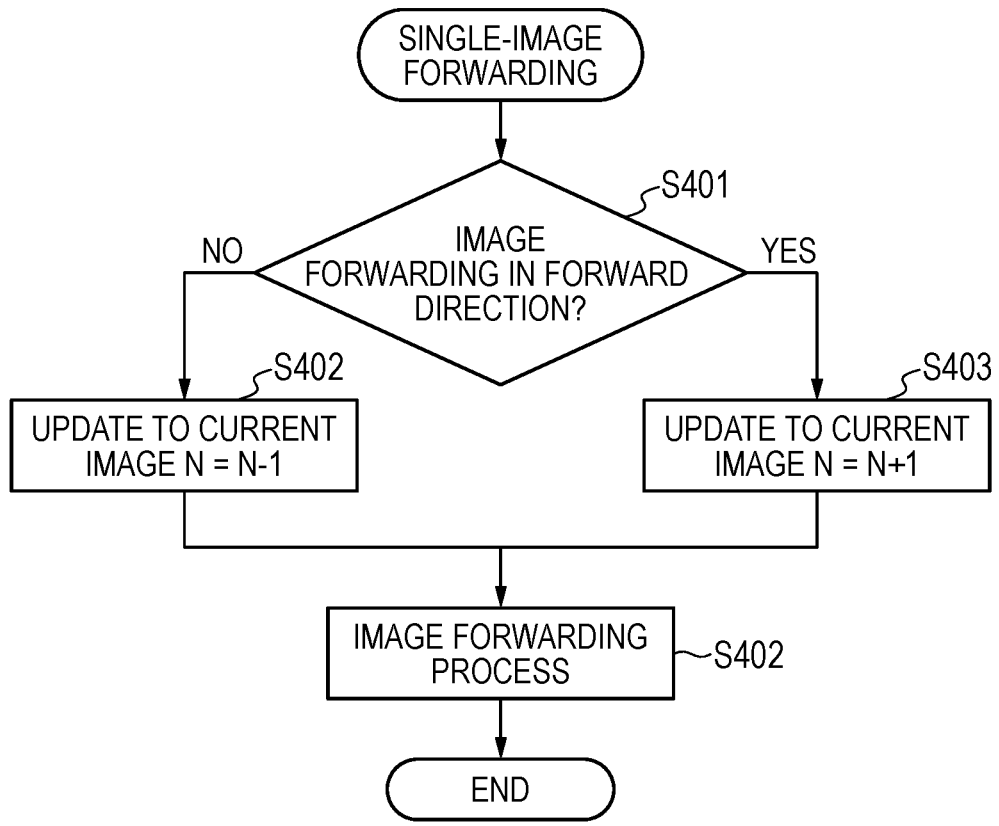
FIG. 4 is a flowchart of a single-image forwarding operation.

FIG. 4 is a flowchart illustrating a single-image forwarding operation in a playback process and illustrates the detailed process of S307 of FIG. 3.

In S401, the system control unit 250 determines whether or not the forwarding direction of the image forwarding instructed in S304 of FIG. 3 is a forward direction. In S401, if it is determined that the operation performed in S304 is on the right key 176a, the process proceeds to S403, otherwise, that is, if it is determined that the operation performed in S304 is on the left key 176b, the process proceeds to S402. In this way, the system control unit 250 can switch the image to be displayed on the display unit 128 to an immediately previous image or an immediately subsequent image in order in accordance with the operation on the left key 176b or the right key 176a.

Here, a forwarding direction in which displayed images are switched in ascending order in the file number provided to each image is defined as the forward direction, and in contrast, a forwarding direction in which displayed images are switched in descending order is defined as the backward direction, for example. Note that the image forwarding direction based on the file number is an example, and alternatively the direction may be defined based on order of the storage date and time or order of the name (alphabetical order or the order of the Japanese syllabary) when names are provided to image files, for example.

In S402, the system control unit 250 updates a current image N (updates a current image N=N−1) and stores the updated current image in the system memory 252.

In S403, the system control unit 250 updates a current image N (updates a current image N=N+1) and stores the updated current image in the system memory 252. Note that, in S402 or S403, when the current image N to be updated is already the image at one end of the order of all the images, it may be switched to the image at the other end of the order. That is, when the current image is the first image in the display order and when the left key 176b is operated, the current image may be updated to display the last image in the display order.

Then, in next S404, the system control unit 250 displays the current image updated in S402 or S403 on the display unit 128. After this process of S404, the system control unit 250 ends the process of the flowchart of FIG. 4 and transfers the process back to S304 of FIG. 3.

Description of Image Jump Forwarding Operation

Next, the playback process will be described in detail.

When performing image jump forwarding, the digital camera 100 controls the operation of image jump forwarding based on attribute information of a displayed image which is currently displayed (current image) and an image moved by a predetermined number of images (reached by a jump in image jump forwarding). That is, the operation of image jump forwarding is controlled based on whether the image reached by a jump in image jump forwarding is an image (a single-image) or a moving image that is not included in group images and does not form group images or otherwise group images.

Group image as used herein refers to a group of images including a plurality of images associated with each other stored in continuous capture such as burst capture or a series of capture operations such as interval capture, for example. Since group images include images captured based on a single capture instruction or highly related images captured continuously, the subjects taken in respective images are often the same (the same subject is often taken).

Examples of group images may be, for example, burst capture images captured in the burst capture mode of a drive setting, images captured in an auto burst capture setting in a creative shot mode, images captured in an interval capture mode, or the like. Note that the creative shot mode is a mode for capturing a plurality of images by burst capture and automatically generating a plurality of processed images in which trimming or different image effects are applied to captured images based on a determination result of determining a subject, a capture scene, or the like. In the creative shot mode, a plurality of images in which a normal captured image is added to these plurality of processed images are stored. The interval capture mode is a mode in which a capture interval and the number of captured images are selectively set and the capture is automatically performed according to the set capture interval and the number of captured images. In a moving image captured as an interval moving image, an image which is set to be left as a material is included in group images.

Figure 8:
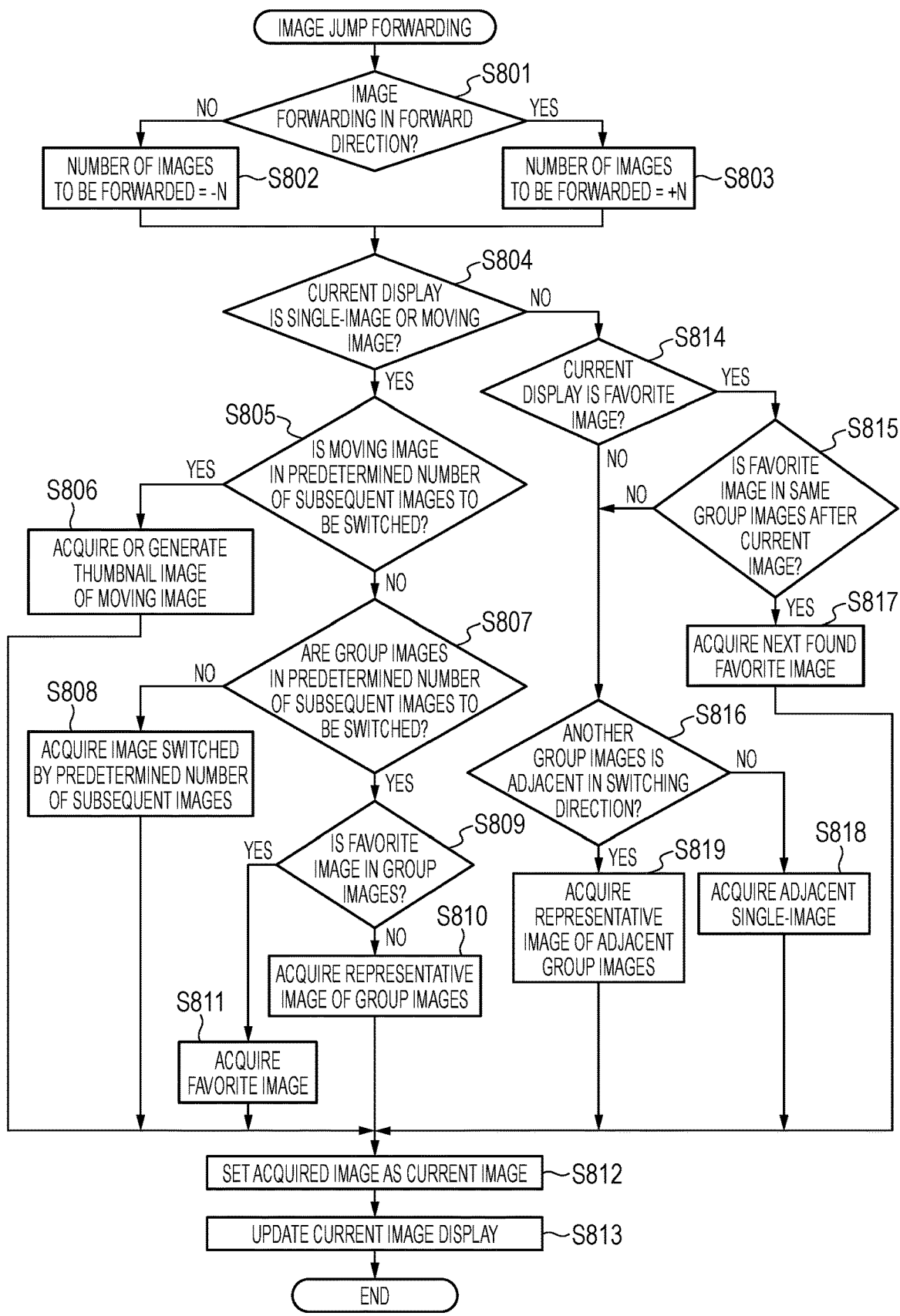
FIG. 8 is a flowchart of an image jump forwarding operation.

FIG. 8 is a flowchart illustrating a process of image jump forwarding in the present embodiment and illustrates the detailed process of S308 of FIG. 3 described above. The program stored in the non-volatile memory 256 is expanded to the system memory 252, and the system control unit 250 executes the program, and thereby the above process is implemented. Note that this process is started when the digital camera 100 is powered on and the playback mode is started.

Figure 5:
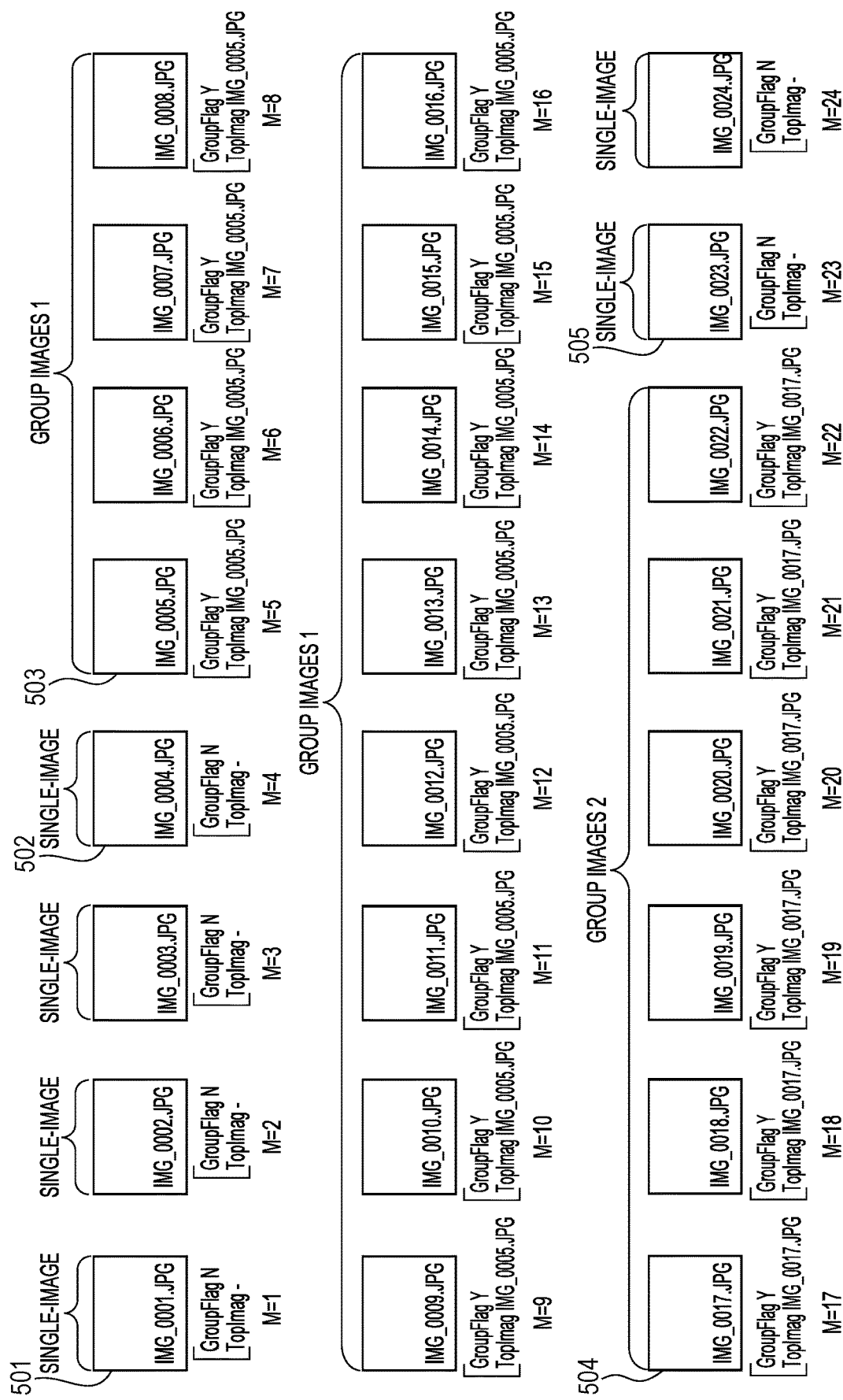
FIG. 5 is a diagram illustrating an example of an image jump forwarding operation based on attribution information.
Figure 6:
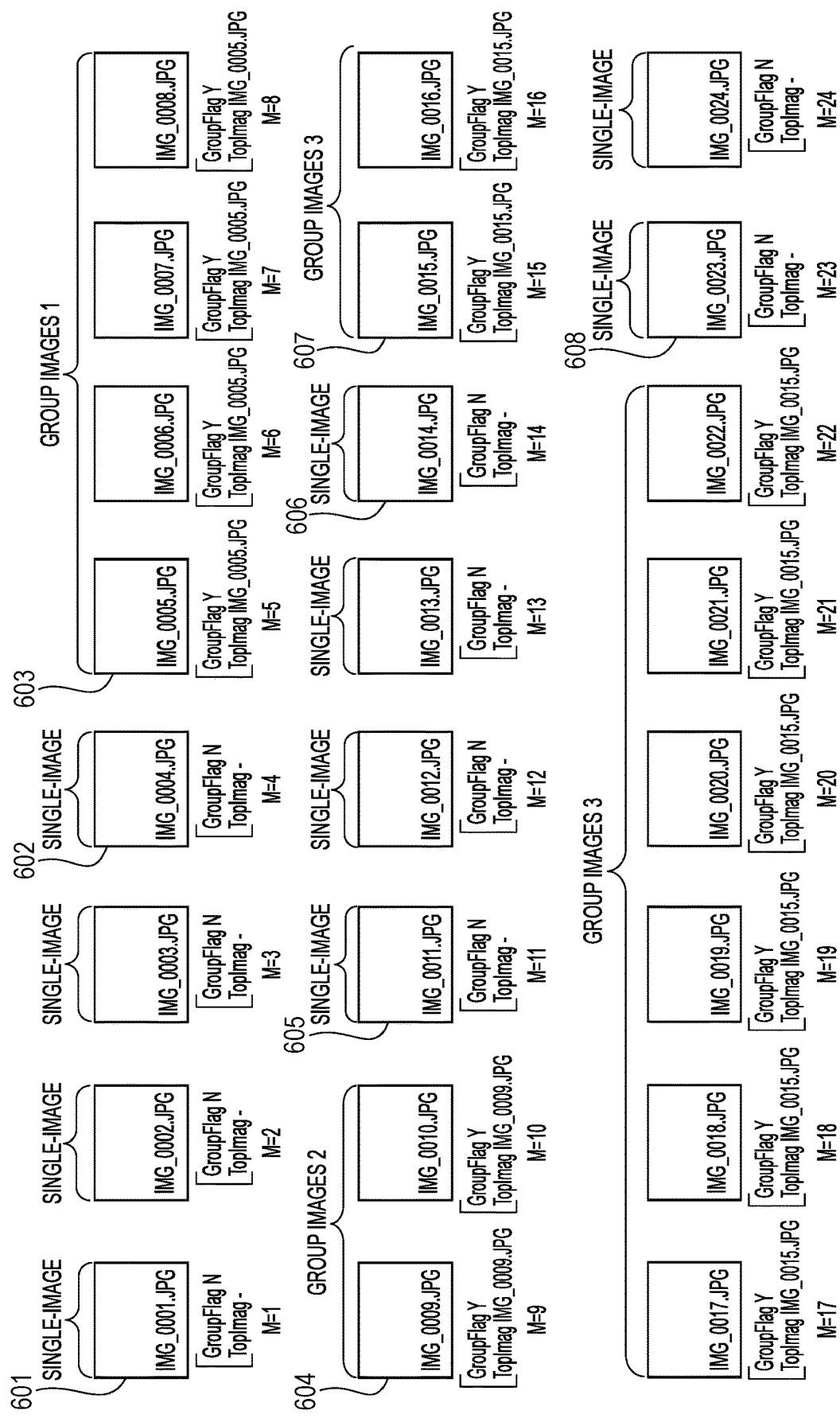
FIG. 6 is a diagram illustrating another example of an image jump forwarding operation based on attribution information.
Figure 7:
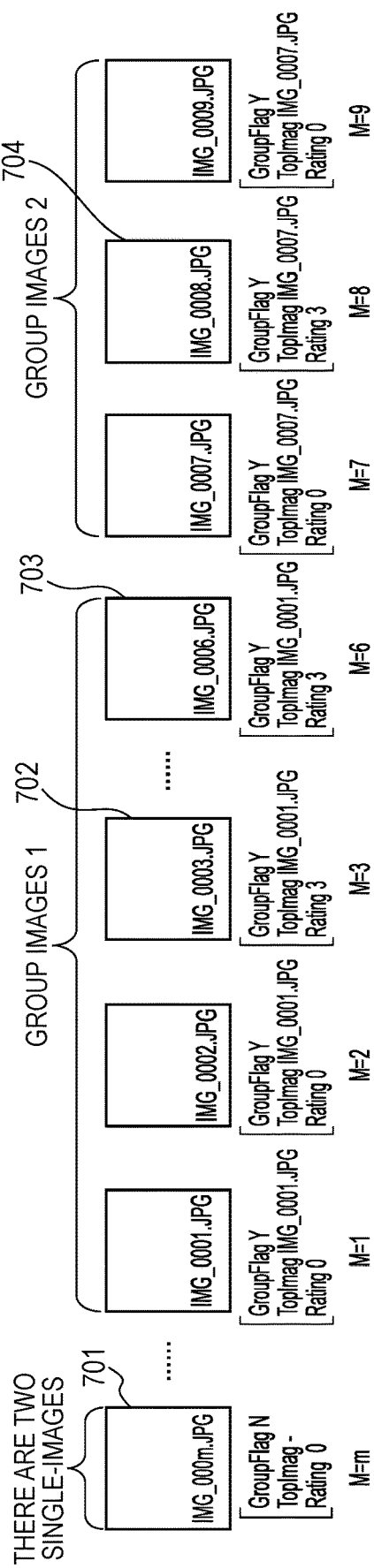
FIG. 7 is a diagram illustrating an example of an image jump forwarding operation based on "favorite" information.

FIG. 5 to FIG. 7 are diagrams illustrating an example of the images stored in the storage medium 190 and attribute information provided to these images, respectively. The attribute information includes at least a file number, a group image flag, and representative image information.

In FIG. 5 to FIG. 7, each file number is illustrated as IMG_nnnn.JPG. The file number IMG_nnnn.JPG denotes a number provided to each image stored in the storage medium 190, and a number such as storage order or the like is described in the form of nnnn. The extension provided to each file number denotes a file format of an image, and an example in which the extension (.JPG) that indicates a JPEG file is described is illustrated in the case of FIG. 5 to FIG. 7. Note that the above file format is an example, and in a case of another file format, the extension of each file number will be an extension in accordance with the file format thereof.

Further, in FIG. 5 to FIG. 7, each group image flag is denoted as GroupFlag. The GroupFlag is an index (flag) indicating whether or not each image belongs to group images, "Y" is described in GroupFlag when an image belongs to group images, and "N" is described in GroupFlag when an image does not belong to group images (for example, in a case of a single-image). In the case of FIG. 5, each image of the file numbers IMG_0001.JPG to IMG_0004.JPG, IMG_0023.JPG, and IMG_0024.JPG is a single-image that is not of group images. Thus, "N" is described in GroupFlag of each of the above images that are single-images. On the other hand, each image of the file numbers IMG_0005.JPG to IMG_0016.JPG belongs to group images (group images 1), and each image of the file numbers IMG_0017.JPG to IMG_0022.JPG belongs to group images (group images 2). Thus, "Y" is described in GroupFlag of each of the above images that belong to respective group images (group images 1, group images 2).

Further, in FIG. 5 to FIG. 7, the representative image information is denoted as TopImg. In representative image information, when GroupFlag is "Y", the file number of the representative image of group images to which the image belongs is appended to TopImg.

In the example of FIG. 5, since each image of the file numbers IMG_0001.JPG to IMG_0004.JPG, IMG_0023.JPG, and IMG_0024.JPG is a single-image, no file number of a representative image is appended to TopImg. On the other hand, in the group images 1 of the file numbers IMG_0005.JPG to IMG_0016.JPG, the representative image is the head image of the group images 1, for example (the image of the file number IMG_0005.JPG of the group images that is initially stored). Therefore, TopImg IMG_0005.JPG is described as the representative image information of each image of the file numbers IMG_0005.JPG to IMG_0016.JPG that belong to the group images 1. Similarly, in the group images 2 of the file numbers IMG_0017.JPG to IMG_0022.JPG, the representative image is the image of the head file number IMG_0017.JPG of the group images 2. Therefore, TopImg IMG_0017.JPG is described as the representative image information of each image of the file numbers IMG_0017.JPG to IMG_0022.JPG that belong to the group images 2.

Note that, while the example in which the representative image is the head image of group images is illustrated, the representative image may be the last image of group images or alternatively may be any image of group images which is set by the user. Further, the representative image of each group images is not limited to one image but may be a plurality of images such as when a plurality of images are set by the user.

As described above, in the example of FIG. 5, following to four single-images of the file numbers IMG_0001.JPG to IMG_0004.JPG, twelve images of the group images 1 of the file numbers IMG_0005.JPG to IMG_0016.JPG are arranged. Furthermore, subsequently, six images of the group images 2 of the file numbers IMG_0017.JPG to IMG_0022.JPG are arranged, and then two single-images of the file numbers IMG_0023.JPG and IMG_0024.JPG are arranged. When the file numbers are provided in capture order as seen in the example of FIG. 5, these images are stored in the storage medium 190 in this order. Note that, in FIG. 5, the order of M=1, M=2, . . . , and M=24 indicates playback order (arrangement order of images) when single-image forwarding is performed in the forward direction, for example.

In S801, the system control unit 250 determines whether or not the direction of image forwarding caused by the operation of the controller wheel 173 in S305 of FIG. 3 is the forward direction described above.

If it is determined that the image forwarding direction is the forward direction in S801, the system control unit 250 transfers the process to S803 and sets image jump forwarding in the forward direction to an image moved by a predetermined number of subsequent images, that is, sets it to image jump forwarding for a predetermined number of images (N images) in the forward direction. On the other hand, if it is determined that the image forwarding direction is not the forward direction in S801, the system control unit 250 transfers the process to S802 and sets the image jump forwarding in the backward direction to an image moved by a predetermined number of preceding images, that is, sets it to image jump forwarding by a predetermined number of images (N images) in the backward direction. Note that the predetermined number N of images is the number of images specified in advance by the setting of the number of images for image jump forwarding. After the process of setting image jump forwarding in S803 or S802, the system control unit 250 transfers the process to S804.

In S804, the system control unit 250 determines whether or not the current image that is currently displayed is a single-image or a moving image, that is, whether a single-image or a moving image or otherwise group images. The system control unit 250 determines whether or not the current image that is currently displayed or the image reached by a jump is performed is a single-image or a moving image or otherwise group images based on attribute information provided to each image. If the group image flag GroupFlag of the current image is "N", the system control unit 250 determines the current image as a single-image or a moving image and transfers the process to S805. Further, when the extension of the file number of the current image is an extension of a moving image format, the system control unit 250 determines the current image as a moving image and transfers the process to S805. On the other hand, if the group image flag GroupFlag of the current image is "Y", the system control unit 250 determines the current image as group images and transfers the process to S814.

In the example of FIG. 5, it is assumed that image jump forwarding by every three images is set, the current image that is currently displayed is an image 501 of the file number IMG_0001.JPG, and the direction of image forwarding is instructed in the forward direction. In the case of the example of FIG. 5, the image 501 of the file number IMG_0001.JPG is a single-image whose group image flag GroupFlag is "N". Thus, Yes is determined in S804 with respect to the image 501, the process proceeds to S805.

It is assumed that, when an image 503 that is the representative image of the group images 1 is displayed as a current image, image jump forwarding in the forward direction is further instructed. The image 503 of the file number IMG_0005.JPG has a group image flag GroupFlag of "Y". Thus, No is determined in S804 with respect to the image 503, and the process proceeds to S814.

In S805, the system control unit 250 determines whether or not there is a moving image from the currently displayed image to the subsequent (preceding) image moved by a predetermined number of images (N images) for image jump forwarding. If it is determined that there is a moving image whose extension of the file number is an extension of a moving image format, the system control unit 250 transfers the process to S806, and if there is no moving image, the system control unit 250 transfers the process to S807.

Note that the determination in S805 may be made by determining whether or not the image switched by a predetermined number of images from the current displayed image is an image of group images. For example, when the number of images to be jumped in forwarding is 100 and there are about four to five sets of group images in the 100 images, the user who intends to switch images by skipping about 100 images after displaying an image of the group images may feel that the number of operations is large. Even when the user intends to switch images by jumping about 100 images, when the 100th image from the current image is an image of group images, a representative image of the group images including the image is displayed. In this case, when the 100th image from the current image is an image included in group images, the process proceeds to S809, and otherwise (the 100th image from the current image is not an image of group images) the process proceeds to S808. By doing so, it is possible to perform image forwarding at an interval closer to the number of jumped images desired by the user.

In S806, when a thumbnail image of the moving image is stored in advance or the like, the system control unit 250 acquires the thumbnail image, and when no thumbnail image is stored or the like, the system control unit 250 generates a thumbnail image and then transfers the process to S812. Images are acquired from the storage medium 190 based on a playback list of images generated when playing back images, and the acquisition of images is performed by being expanded to the memory control unit 215.

In S812, the thumbnail image is displayed. In this way, in the present embodiment, even when a predetermined number of images for image jump forwarding is not reached in the image jump forwarding, as long as a moving image is included in these images, it is possible to suspend the image jump forwarding in the moving image and displays display the thumbnail image. This enables the user to verify the presence of a moving image.

In the case of the example of FIG. 5, each image in three images in the forward direction from the image 501 has an extension of a file number of a static image and does not have an extension of a moving image. Thus, when the image 501 is the currently displayed image, No is determined in S805, and the process proceeds to S807.

When the process proceeds to S807, the system control unit 250 searches for whether or not there are group images from the currently displayed image to the subsequent (preceding) image moved by a predetermined number of images (N images) for image jump forwarding. If there is an image whose group image flag GroupFlag is "Y", the system control unit 250 determines from the attribute information of respective images up to the predetermined number of images that there are group images and transfers the process to S809. On the other hand, if there is no image whose GroupFlag is "Y", the system control unit 250 determines that there are no group images and transfers the process to S808.

When the process proceeds to S808, the system control unit 250 acquires a subsequent image moved by a jump of a predetermined number of images for image jump forwarding (that is, a single-image subsequent to N images).

With respect to the image 501 of FIG. 5, since No is determined in S805 and No is further determined in S807, an image 502 of the file number IMG_0004.JPG that is subsequent to three images in the forward direction from the image 501 is acquired as an image to be displayed by image jump forwarding. In this way, when single-images are arranged up to a predetermined number of subsequent images in image jump forwarding, image jump forwarding by a predetermined number of images is performed. With respect to the image 501, in S808, the image 502 of the file number IMG_0004.JPG subsequent to three images in the forward direction is the image to be displayed in the image jump forwarding.

When the image 502 that is a single-image is the current image, and when jump in the forward direction is further instructed, the system control unit 250 determines whether or not there is an image of group images in three subsequent images in image jump forwarding in the same manner as described above. With respect to the image 502, the next image 503 of the file number IMG_0005.JPG in the forward direction has GroupFlag of "Y" described therein and representative image information of TopImg IMG_0005.JPG described therein. In this case, the system control unit 250 recognizes that the image 503 belongs to group images (the group images 1 in the example of FIG. 5) and the representative image of the group images 1 is the image 503 whose file number is IMG_0005.JPG. Thus, with respect to the image 503, the system control unit 250 determines Yes in S807 and transfers the process to S809.

In S809, the system control unit 250 searches for a favorite image whose Rating described later is greater than "0" for each image in the forward direction out of group images having GroupFlag of "Y" and the same file number of TopImg. When a favorite image is searched for, the system control unit 250 transfers the process to S811. Further, if it is determined that there is no "favorite" information in the group images to be switched as a result of the search, the system control unit 250 transfers the process to S810.

FIG. 7 illustrates an example of arrangement order of respective images when Rating of "favorite" information is provided as attribute information. In the example of FIG. 7, following to two successive single-images arranged as the file number IMG_000 m.JPG, six images of the group images 1 of the file numbers IMG_0001.JPG to IMG_0006.JPG are arranged. Subsequently, three images of the group images 2 of the file numbers IMG_0007.JPG to IMG_0009.JPG are arranged.

In S810, the system control unit 250 acquires a representative image of group images searched in S807 and then transfers the process to S812. With respect to the image 502 (single-image) displayed as the current image, a display image to be next displayed as a result of image jump forwarding is the image 503 of the file number IMG_0005.JPG that is a representative image of the group images 1.

In S811, the system control unit 250 acquires a favorite image searched for from the group images and then transfers the process to S812.

In the example of FIG. 7, it is assumed that the current image that is currently displayed is an image 701 of the file number IMG_000 m.JPG and image forwarding is instructed in the forward direction. It is assumed that the image 701 having the file number IMG_000 m.JPG is a single-image whose group image flag GroupFlag is "N" and "favorite" information Rating is "0", for example. Further, in the case of the example of FIG. 7, there are an image 702 of the file number IMG_0003.JPG and an image 703 of the file number IMG_0006.JPG as images whose Rating value is greater than "0" in the group images 1. Thus, when jump forwarding is instructed in the forward direction from the image 701, the image 702 that is a favorite image of the group images 1 of FIG. 7 is acquired in S811. Note that, while an example in which a threshold in acquisition of a favorite image is the value of Rating "0" is illustrated in FIG. 7, the threshold of Rating in displaying a favorite image by using image jump forwarding is not limited to "0" but can be set to any value by the user.

In S812, the system control unit 250 defines a favorite image acquired in S806, S810, and S811 and S817 to S819 described later as the current image and displays the current image on the display unit 128 in next step S813. The system control unit 250 then ends the process of the flowchart of FIG. 8 (the process of S308 of FIG. 3) and transfers the process back to S304 of FIG. 3.

When the process proceeds to S814, the system control unit 250 determines whether or not the current image that is currently displayed is a favorite image, that is, an image whose Rating is greater than "0". If the current displayed image is the image 702 or the image 703 of FIG. 7, since the image 702 or the image 703 is a favorite image, Yes is determined in S814. On the other hand, when the currently displayed image is an image of group images but not a favorite image such as the image 503 of FIG. 5, No is determined in S814. Then, if it is determined as the favorite image, the system control unit 250 transfers the process to S815, and if it is not determined as the favorite image, the system control unit 250 transfers the process to S816.

In S815, the system control unit 250 searches images in the direction of image jump forwarding in the current group images (group images having GroupFlag of "Y" and the same file number of TopImg) for a favorite image whose Rating is greater than "0". Then, if a favorite image has been successfully searched for in the same group images in S815, the system control unit 250 transfers the process to S817, while if no favorite image has been searched for, the system control unit 250 transfers the process to S816. When the currently displayed image is the image 702 of FIG. 7, the image 703 of the file number IMG_0006.JPG is present other than the image 702 of the file number IMG_0003.JPG as an image whose Rating is greater than "0" in the group images 1. Thus, No is determined in S816. On the other hand, when the currently displayed image is the image 703, since no favorite image is present in the forward direction any longer, No is determined in S815.

In S817, the system control unit 250 acquires the favorite image determined in the searching in S815 and then transfers the process to S812. When the currently displayed image is the image 702, in S817, the image 703 of the next file number IMG_0006.JPG whose Rating value is greater than "0" in the group images 1 is acquired.

In S816, the system control unit 250 determines whether or not another group images are adjacent based on the result of the searching in the direction of image jump forwarding as described above. Then, if it is determined that another group images are adjacent, the system control unit 250 transfers the process to S819. On the other hand, if it is determined that another group images are not adjacent, that is, a single-image is adjacent, the process proceeds to S818.

When the currently displayed image is the image 503 of FIG. 5, what is adjacent to the group images 1 to which the image 503 belongs in the image forwarding direction (forward direction) is another group images (group images 2). In the case of the example of FIG. 5, from the image 503 of the file number IMG_0005.JPG to the image of the file number IMG_0016.JPG, the group image flag GroupFlag is "Y", and the representative image information is TopImg IMG_0005.JPG. Thus, the system control unit 250 determines that each of the images from the file number IMG_0005.JPG to the file number IMG_0016.JPG belongs to the same group images 1. In contrast, in the image 504 of the file number IMG_0017.JPG, while the group image flag GroupFlag is "Y", the representative image information is TopImg Img_0017.JPG, which is different from that of the group images 1. It is therefore determined that the image 504 belongs to another group images (group images 2 in the example of FIG. 5). That is, when the image 503 is displayed, Yes is determined in S816.

Next, a case where the image 504 that is the representative image of the group images 2 is displayed as the current image and an image jump instruction in the forward direction is further instructed will be described. From the image 504 of the file number IMG_0017.JPG to the image of the file number IMG_0022.JPG, the group image flag GroupFlag is "Y", and the representative image information is TopImg IMG_0017.JPG. It is therefore determined that each of the images from the file number IMG_0017.JPG to the file number IMG_0022.JPG belongs to the same group images 2. In contrast, the image 505 of the file number IMG_0023.JPG has the group image flag GroupFlag of "N" indicating a single-image. Thus, when the image 504 is displayed, No is determined in S816, and the process proceeds to S818.

In S818, the system control unit 250 acquires a single-image adjacent to the group images including the currently displayed image in the direction of image jump forwarding. When the currently displayed image is the image 504 of FIG. 5, the image 505 is acquired.

When the process proceeds to S819, the system control unit 250 acquires a representative image of group images that are adjacent to the group images including the currently displayed image in the image jump forwarding. When the current displayed image is the image 503 of FIG. 5, the image 504 is acquired. Further, when a favorite image is included in the adjacent group images, the favorite image is acquired. That is, when the current displayed image is the image 703 of FIG. 7, the system control unit 250 acquires the image 704 in S819.

As discussed above, in the image jump forwarding, an image reached by a jump is determined.

Note that, in the image jump forwarding described above, when the current image that is currently displayed is one of the group images, a single-image which does not belong to the group images and is adjacent to the group images in the image forwarding direction or a representative image of adjacent another group images are displayed. However, when an image subsequent to a predetermined number of images in the image forwarding direction from the current image does not belong to the group images to which the current image belongs to, an image subsequent to a predetermined number of images in the image forwarding direction from the current image may be displayed. In this case, when the image subsequent to a predetermined number of images is a single-image, the image subsequent to a predetermined number of images may be displayed, and when the image subsequent to a predetermined number of images is one of the group images which belongs to a group different from the current image, the representative image of the group images to which the image subsequent to a predetermined number of images belongs may be displayed.

That is, when the current image and an image subsequent to a predetermined number of images in the image forwarding direction do not belong to the same group (for example, when the current image and the image subsequent to a predetermined number of images are both single-images, when the current image is a single-image and the image subsequent to a predetermined number of images is one of group images, when the current image is one of group images and the image subsequent to a predetermined number of images is a single-image, or when the current image and the image subsequent to a predetermined number of images are of different group images from each other), the image subsequent to a predetermined number of images may be displayed. When the image subsequent to a predetermined number of images is one of group images, the representative image of the group images instead of the image subsequent to a predetermined number of images may be displayed. Further, when the current image and the image subsequent to a predetermined number of images in the image forwarding direction belong to the same group, a single-image adjacent to the group in the image forwarding direction or a representative image of the adjacent group images may be displayed as illustrated in S818 and S819.

Description of Menu Setting Operation

Figure 9:
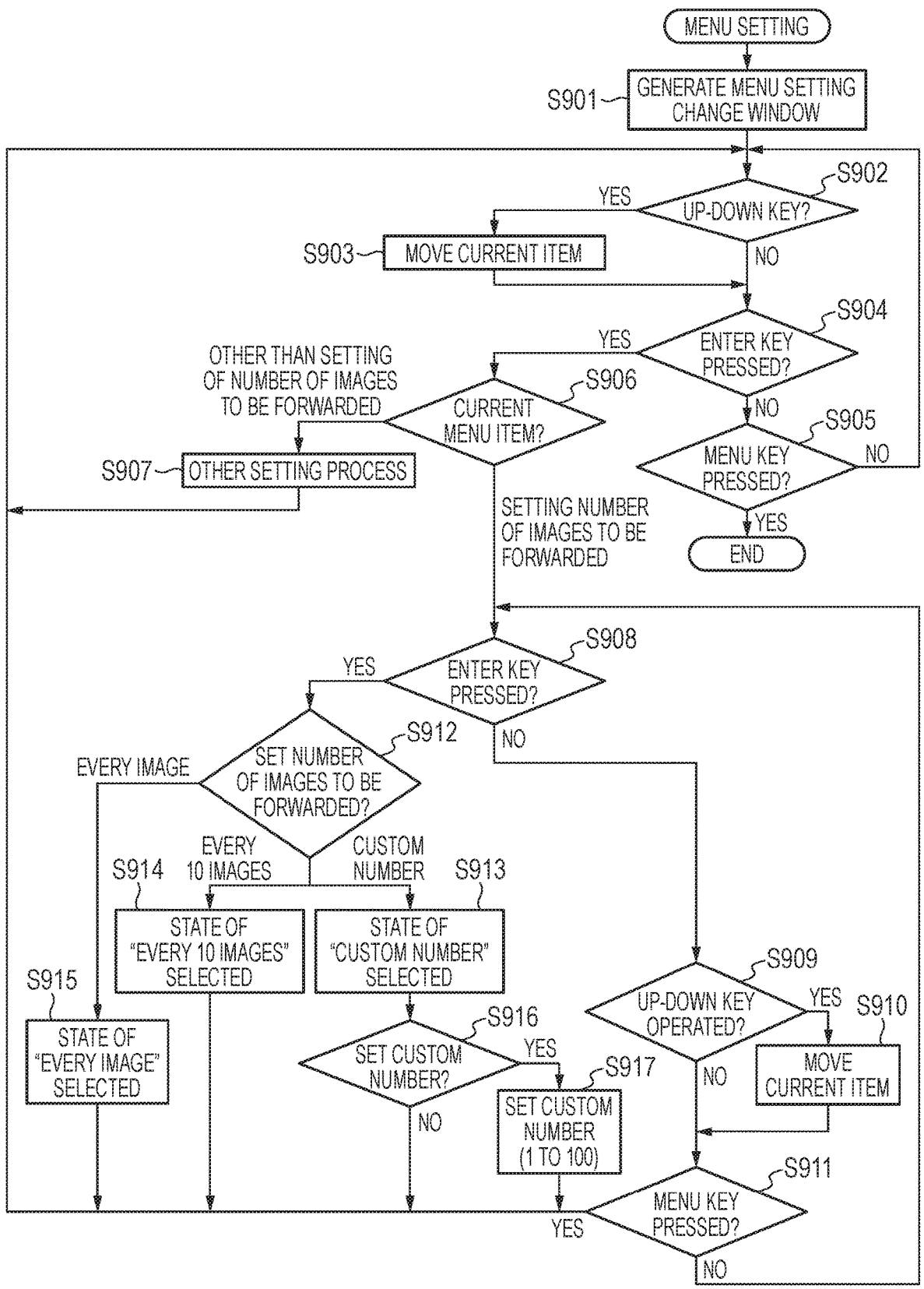
FIG. 9 is a flowchart of an operation of setting the number of images to be forwarded.

FIG. 9 is a flowchart illustrating an operation of setting the number of images for image forwarding in menu setting and illustrates the detailed process of S310 of FIG. 3.

In S901, the system control unit 250 generates a menu setting change window in accordance with a program written to the system memory 252 and sets the currently selected item (hereafter, referred to as a current item) to display it on the display unit 128.

Next, in S902, the system control unit 250 determines whether or not the up key or the down key of the up, down, left, and right buttons, namely, the four-direction button of the operating units 170 is operated by the user, for example. In this example, since selection of the current item is performed by a cursor being placed at any one of the multiple items aligned in the vertical direction on the screen of the display unit 128 for selection, an example of operation of up-down keys will be illustrated.

Note that, when multiple items are aligned in the horizontal direction on the screen, for example, an item is selected by an operation of the left-right keys. In the case of setting the number of images to be forwarded, items such as "every image", "every ten images", "custom number", and the like are displayed as an example on the screen of the display unit 128, and the cursor is placed on any one of these items and then an enter operation described later is performed through the up-down key operation.

The image jump forwarding of every three images illustrated in FIG. 5 to FIG. 7 described above is an example in which three images are set as the custom number, for example. If it is determined that an up-down key operation is performed in S902, the system control unit 250 transfers the process to S903. On the other hand, if it is determined that no up-down key operation is performed, the system control unit 250 transfers the process to S904. In S903, the system control unit 250 moves the selection state of the current item in the direction in accordance with the up-down key operation by the user and then transfers the process to S904.

In S904, the system control unit 250 determines whether or not an enter key operation allocated to an enter operation in the operating units 170 (for example, a press operation of the set button) is performed. Then, the system control unit 250 transfers the process to S906 if it is determined that an enter key operation is performed, and transfers the process to S905 if it is determined that no enter key operation is performed.

In S905, the system control unit 250 determines whether or not a menu key operation of the operating units 170 is performed and, if it is determined that a menu key operation is performed, ends the process of the menu setting of FIG. 9 and transfers the process back to S304 of FIG. 3. On the other hand, if it is determined that no menu key operation is performed in S905, the system control unit 250 transfers the process back to S902 and continues the process in the menu setting window.

When the process proceeds to S906, the system control unit 250 determines whether or not the current menu item is the item for setting the number of images to be forwarded. The system control unit 250 transfers the process to S906 if it is determined that it is the item for setting the number of images to be forwarded while transfers the process to S907 if it is determined as a different item from the item for setting the number of images to be forwarded.

In S907, the system control unit 250 performs a menu setting process of a different item from the item for setting the number of images to be forwarded. The system control unit 250 then transfers the process back to S902 after the setting process in S907 and continues the process in menu setting window.

When the process proceeds to S908, the system control unit 250 moves to a window for setting the number of images to be forwarded and determines whether or not an enter key operation of the operating units 170 is performed. The system control unit 250 transfers the process to S912 if it is determined that an enter key operation is performed and transfers the process to S909 if it is determined that no enter key operation is performed. Then, in S909, the system control unit 250 determines whether or not the up-down key of the operating units 170 is operated and, if operated, transfers the process to S910, otherwise, transfers the process to S911.

In S910, the system control unit 250 moves the selection state of the current item in the direction of the up-down key operation in S909 and, upon the completion of the movement, transfers the process to S911. In S911, the system control unit 250 determines whether or not a menu key operation of the operating units 170 is performed and, if operated, transfers the process to S902 to exit the window for setting the number of images to be forwarded. On the other hand, if it is determined that the up-down key is not operated in S911, the system control unit 250 transfers the process back to S908 and continues the process in the window for setting the number of images to be forwarded.

In S912, the system control unit 250 determines the item on which the cursor is placed at the time of an enter operation by the enter key operation. In S912, if the cursor at the time of an enter operation is placed on the item of "every image", for example, the system control unit 250 transfers the process to S915, sets the number of images to be forwarded to "one", and sets the setting information to the system memory 252.

Then, the system control unit 250 transfers the process back to S902 after S915. Further, in S912, if the cursor at the time of an enter operation is placed on the item of "every 10 images", for example, the system control unit 250 transfers the process to S914, sets the number of images to be forwarded to "10", and sets the setting information to the system memory 252. Then, the system control unit 250 transfers the process back to S902 after S914. Further, if the cursor at the time of an enter operation is placed on the item of "custom number", for example, the system control unit 250 transfers the process to S913, sets the number of images to be forwarded to "custom number", and sets the setting information to the system memory 252. Then, the system control unit 250 transfers the process to S916 after S913.

In S916, the system control unit 250 determines whether or not setting of the custom number is performed by the user and, if no setting of the custom number is performed by the user, transfers back to S902 and continues the process in the menu setting window. On the other hand, if setting of the custom number is performed by the user in S916, the system control unit 250 moves to the process of S917 and sets, to the system memory 252, the number of images to be forwarded from any of 1 to 100 set by the user on a predetermined setting window. In such a way, any number of images from 1 to 100 can be set as a custom number. After the process of setting of a custom number in S917, the system control unit 250 transfers the process back to S902 and continues the process in the menu setting window.

Next, an example of image jump forwarding will be described by using FIG. 6. In the example of FIG. 6, following to four single-images of the file number IMG_0001.JPG to IMG_0004.JPG, four images of group images 1 of the file number IMG_0005.JPG to IMG_0008.JPG are arranged. Subsequently, two images of group images 2 of the file number IMG_0009.JPG and IMG_0010.JPG are arranged, and then four single-images of the file number IMG_0011.JPG to IMG_0014.JPG are arranged. Furthermore, eight images of group images 3 of the file number IMG_0015.JPG and IMG_0022.JPG are arranged, and then two single-images of the file number IMG_0023.JPG and IMG_0024.JPG are arranged.

Also in FIG. 6, image jump forwarding operation control in the digital camera 100 will be described with an example when image jump forwarding of every three images has been set in advance in the same manner as described above. In the example of FIG. 6, in the same manner as described above, it is assumed that image jump forwarding of every three images has been set, the current image that is currently displayed is an image 601 of the file number IMG_0001.JPG, and the image forwarding direction is instructed in the forward direction.

In the example of FIG. 6, the image 601 of the file number IMG_0001.JPG is a single-image whose group image flag GroupFlag is "N". Each of the images included in the subsequent three images in the forward direction from the image 601 is a single-image whose GroupFlag is "N". Thus, an image 602 of the file number IMG_0004.JPG subsequent to three images in the forward direction from the image 601 is a displayed image as a result of image jump forwarding.

Next, when the image 602 that is a single-image is the current image, and when a jump in the forward direction is further instructed, there is a group image in the subsequent three images in the image jump forwarding. In the example of FIG. 6, the image 603 of the file number IMG_0005.JPG that is the next to the image 602 in the forward direction has GroupFlag "Y" and TopImg IMG_0005.JPG and belongs to the group images 1. Thus, an image to be displayed by the image jump forwarding next to the image 602 that is a single-image is set to an image 603 of the file number IMG_0005.JPG, which is the representative image of the group images 1.

Next, it is assumed that, when the image 603 that is the representative image of group images 1 is displayed as the current image, image jump forwarding in the forward direction is further instructed. Another group images or a single-image adjacent in the image forwarding direction (forward direction) to the group images 1 to which the image 603 belongs is searched for. In the case of the example of FIG. 6, from the image 603 of the file number IMG_0005.JPG to the image of the file number IMG_0008.JPG, the group image flag GroupFlag is "Y", and the representative image information is TopImg IMG_0005.JPG.

That is, the images from the file number IMG_0005.JPG to the file number IMG_0008.JPG belong to the group images 1. In the case of the example of FIG. 6, an image 604 of the file number IMG_0009.JPG has the GroupFlag of "Y" and the representative image information of TopImg IMG_0009.JPG. It is therefore determined that the image 604 belongs to another group images (group images 2) and it is recognized that the representative image of the group images 2 is the image 604. The image to be displayed by the image jump forwarding next to the image 603 is then set to the image 604 of the file number IMG_0009.JPG, which is the representative image of the group images 2 adjacent to the group images 1 in the forward direction.

Next, when the image 604 that is the representative image of the group images 2 is displayed as the current image and when image jump forwarding in the forward direction is further instructed, a jump to an image 605 is performed. While the image 604 of the file number IMG_0009.JPG and the image of the file number IMG_0010.JPG have Group-Flag of "Y", the image 605 of the file number IMG_0011.JPG has GroupFlag of "N". Thus, the image 605 that is a single-image is searched for as another group images or a single-image adjacent to the group images 2. Then, the image to be displayed by image jump forwarding next to the image 604 is set to the image 605 of file image IMG_0011.JPG, which is a single-image adjacent to the group images 2 in the forward direction.

When the image 605 that is a single-image is the current image and when a jump in the forward direction is further instructed, each of three subsequent images from the image 605 is a single-image having GroupFlag of "N". Thus, the image 606 of the file number IMG_0014.JPG is the image to be displayed by the image jump forwarding. When a jump in the forward direction is further instructed one after another, the image is jumped from the image 605 to an image 606, an image 607, and then an image 608.

Next, a case where image jump forwarding in the backward direction is instructed when the image 608 is displayed will be described, where the number of images for image jump forwarding N=−3.

Once jump forwarding in the backward direction is instructed, the image 608 is switched to the representative image 607 of group images 3 adjacent in the backward direction. Note that, in the case of the backward direction, a latter image in the playback order of group images may be a representative image. That is, the image of IMG_0022 may be displayed.

Next, a jump is performed from the image 607 to the image 606 that is a single-image, and a jump is performed from the image 606 to the image 605. Although the group images 1 are arranged at three images from the image 605 in the backward direction, since the group images 2 are arranged between the group images 1 and the image 605, the representative image 604 of the group images 2 is displayed. From the image 604, the representative image 603 of the group images 1 adjacent in the backward direction is displayed, and from the image 603, the images 602 and 601 are sequentially displayed.

Note that, in the example of the image jump forwarding by every three images as described above, when the image 601 is displayed as the current image and when image jump forwarding is instructed, for example, the image 603 may be displayed without the image 602 being displayed. That is, when the current image is a single-image and there are no group images in three subsequent images from the current image but there are group images in the subsequent images that are close to some degree such as five or six images, for example, a jump may be performed to the representative image of that group images. By doing so, when an image of group images is displayed with forwarding another few images, it is possible to quickly switch the display to the image of the group images.

According to the embodiment described above, it is possible to improve the operability at the user in image jump forwarding. When the user searches a large number of images for a desired image, the amount of operation will be large if the desired image is not immediately found. Group images are likely to include a plurality of similar images. Thus, when a large number of similar images are included, it is possible to reduce the amount of user operation by displaying the representative image of the group images.

When group images are included between a single-image and the next image reached by a jump, the representative image of the group images is the image to be displayed by the image jump forwarding, for example, without a jump up to the set number of images. Regardless of a predetermined number of images, when there are group images within the predetermined number of images from the current image, an image of group images is displayed.

For example, when the number of jumped images is 10 and an image of group images is subsequent to 5 images from the currently displayed image, the image of group images is displayed even when 10 images have not yet been switched. When searching an image, the user is likely to memorize the captured images in time sequence order. Further, group images are likely to be images that reflect a higher motivation of the user for capturing. Therefore, the image of group images is displayed even when the predetermined number of images have not yet been switched, which facilitates the user to determine whether or not a desired image is captured around the order of the displayed image.

Thus, the user can locate a desired image by performing a few times of operations around the desired image without searching for the desired image by performing a single-image forwarding for many times around an image far from the desired image, which improves the operability. Note that, since images included in group images are likely to be similar images, the user who searches for an image can reach a desired image more quickly when farther subsequent images are quickly displayed than when similar images are displayed many times.

Further, since a favorite image of group images is displayed in image jump forwarding, an image with a favorite mark can be recognized. This facilitate the user to determine whether a desired image is close to or far from the image being displayed by checking an image which is more likely to be memorized out of a large number of images.

When an image of group images is displayed in image jump forwarding, a predetermined item indicating that the image is of group images may be displayed, this item display allows the user to recognize group images.

Then, when an image of group images is displayed as the current image and when image jump forwarding is further instructed, an image of another group images adjacent in the image forwarding direction is searched for, and an image of group images found by the search is displayed. Thus, when the representative image of the adjacent group images is closer to the image reached by image jump forwarding (N images from the current image), since the representative image of group images is displayed.

Thus, when searching for group images, the user does not miss the image. When image jump forwarding is instructed when an image of group images is displayed as the current image and when there is a single-image adjacent in the image forwarding direction, the single-image is searched for and displayed. For example, when several single-images are captured after group images, these single-images are likely to be images having different subjects, images captured with different angle, or the like.

For example, when an image jumped from the last image of group images by a set number of images in image jump forwarding is displayed, the user may miss the first image after changing the angle and misunderstand that a desired image is still not reached. Specifically, for example, it is assumed that, in one day, the user takes pictures of a train by burst capture, then takes a single picture of a flower, and finishes capturing and, in the next day, takes a picture of a building. If the image of the flower is jumped over and the image of the building is displayed after the burst-captured images of the train, the user is unable to notice the image of the flower that was taken after burst capture. However, when a single-image immediately after group images is displayed, the image of the flower can be displayed immediately after the burst-captured images even with the above situation. This facilitates the user to accurately understand the order of captured images and search for a desired image.

Further, in the examples described above, as image data stored in the storage medium 190 captured by the digital camera 100, while static images whose extension of the file number is ".JPG" are exemplified, moving image data may also be stored when a moving image is captured by the digital camera 100. That is, a moving image can be handled in a similar manner to group images. Further, in image jump forwarding, a thumbnail image of a moving image can be displayed, for example. In the embodiments described above, when the extension of a file number of data stored in the storage medium 190 is an extension representing a format of a moving image, the data is recognized as a moving image. Then, when a moving image is searched for in the image jump forwarding as described above, a thumbnail image of the moving image is acquired or generated, and the thumbnail image is displayed.

Further, for example, when the user searches for a desired image while jumping some number of images, images included in group images or a moving image in which the same subject is captured wound not be repeatedly displayed. That is, when the number of images belonging to group images is 30 and the number of images set for image jump forwarding is 3, the display can be switched to the next image of group images with less labor without 9 or 10 images due to the jump by every 3 images being displayed. In image jump forwarding, a representative image or a favorite image is searched for and displayed from group images and a thumbnail is displayed from a moving image, and thereby the user can check what subject is captured without viewing a large number of images. As discussed above, the user can perform fast image jump forwarding without missing an important image.

Note that, while an example in which the system control unit 250 performs processes or each control in respective flowcharts has been illustrated in the above examples, each process or each control may be performed by a single hardware or may be performed by a plurality of hardware components with the process being distributed. Further, each process and each control described above may be implemented not only by using the hardware configuration but also by using a software configuration for a part of the processes and the control and a hardware configuration for the rest thereof. The program according to the present embodiment may be prepared in advance in the non-volatile memory 256 described above, may be read from a removable semiconductor memory or the like, or may be downloaded from a network such as the Internet (not illustrated).

Other Embodiments

While the present invention has been described above based on the preferred embodiments, the present invention is not limited to these specific embodiments, and various forms within the scope not departing from the spirits of the invention are included in the present invention. Moreover, each of the embodiments described above is mere illustration of one embodiment of the present invention, and it is possible to properly combine some of the embodiments.

Further, in the embodiments described above, while the case where the present invention is applied to a digital camera has been described as an example, the present invention is not limited thereto. For example, the present invention can be applied to any electronic device as long as it can control a display device that can display an image. Further, the present invention can be applied to an information processing device that can supply a displayed image signal to a display device. That is, the present invention can be applied to a personal computer or a PDA, a mobile phone or portable image viewer, a tablet terminal, a smartphone, an electronic game device, an electronic book reader, a digital picture frame, a projector device, or the like, for example. In addition, the present invention can be applied to a printer device, a music player, a home appliance, an on-vehicle device, a medical apparatus, an industry apparatus, or the like that has a display, for example.

An embodiment of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-178220, filed on Sep. 15, 2017, which is hereby incorporated by reference in its entirety.

What is claimed is:

1. A display control device comprising:
   at least one memory and at least one processor which function as a display control unit that performs control to switch an image to be displayed from a plurality of images, on a display unit, in a predetermined order, in accordance with a predetermined operation for switching an image to be displayed to an image apart by a predetermined number of images from a current image in the predetermined order,
   wherein, when an image apart by the predetermined number of images from the current image in the predetermined order belongs to a first group which is the same group as the current image, in accordance with the predetermined operation, the display control unit performs control not to switch an image to be displayed from the current image to the image apart by the predetermined number of images but instead to switch an image to be displayed from the current image to an image apart by a number of images which is greater than a number of a plurality of images included in the first group in the predetermined order.

2. The display control device according to claim 1, wherein, when the image apart by the predetermined number of images from the current image in the predetermined order is an image which belongs to the first group, in accordance with the predetermined operation, the display control unit performs control to switch display to a next image, the next image being next to a plurality of group images in the first group in the predetermined order.

3. The display control device according to claim 2, wherein in a case where the next image is an image which belongs to a second group different from the first group, in accordance with the predetermined operation, the display control unit performs control to switch display to a representative image of the second group.

4. The display control device according to claim 1, wherein, when no group images are included in images from the current image displayed on the display unit to the image apart by the predetermined number of images in the predetermined order, in accordance with the predetermined operation, the display control unit performs control to switch display from the current image to the image apart by the predetermined number of images.

5. The display control device according to claim 1, wherein, when the current image displayed on the display unit is not one of group images and when group images are included in images from the current image to the image apart by the predetermined number of images in the predetermined order, in accordance with the predetermined operation, the display control unit performs control to switch display from the current image to an image which belongs to the first group.

6. The display control device according to claim 1, wherein, when the current image displayed on the display unit is not one of group images and when group images are included in images from the current image to the image apart by the predetermined number of images in the predetermined order, in accordance with the predetermined operation, the display control unit performs control to switch display from the current image to a representative image of a group to which the group images belong.

7. The display control device according to claim 1, wherein, when the image moved by the predetermined number of images in the predetermined order is not an image which belongs to the first group, in accordance with the predetermined operation, the display control unit performs control to switch display from the current image to the image apart by the predetermined number of images.

8. The display control device according to claim 1, wherein the at least one memory and the at least one processor further function as a setting unit that sets the predetermined number,
   wherein, when the predetermined number is one, in accordance with the predetermined operation, the display control unit performs control to switch display from the current image to the image apart by the predetermined number of images regardless of group images.

9. A display control method that causes a display unit to display a plurality of images in a predetermined order, the display control method comprising:
   a step of, in accordance with a predetermined operation for switching an image to be displayed to an image apart by a predetermined number of images from a current image in the predetermined order, performing control to switch an image to be displayed from the plurality of images, on the display unit, in the predetermined order,
   wherein, when an image apart by the predetermined number of images from the current image in the predetermined order belongs to a first group which is the same group as the current image, the performing step performs control not to switch an image to be displayed from the current image to the image apart by the predetermined number of images but instead to switch an image to be displayed from the current image to an image apart by a number of images which is greater than a number of a plurality of images included in the first group in the predetermined order in accordance with the predetermined operation.

10. A non-transitory storage medium including a program that causes a computer to function as the display control unit of the display control device according to claim 1.

* * * * *